US011297467B2

(12) United States Patent
Zisimopoulos et al.

(10) Patent No.: US 11,297,467 B2
(45) Date of Patent: Apr. 5, 2022

(54) TECHNIQUES FOR MODULAR MULTIMEDIA BROADCAST AND MULTICAST SERVICE (MBMS) DELIVERY

(71) Applicant: QUALCOMM Incorporated, San Diego, CA (US)

(72) Inventors: Haris Zisimopoulos, London (GB); Lorenzo Casaccia, Barcelona (ES); Edward Robert Hall, Bristol (GB); Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/425,498

(22) Filed: May 29, 2019

(65) Prior Publication Data
US 2019/0281420 A1  Sep. 12, 2019

Related U.S. Application Data

(62) Division of application No. 15/204,802, filed on Jul. 7, 2016, now Pat. No. 10,341,820.

(60) Provisional application No. 62/190,969, filed on Jul. 10, 2015.

(51) Int. Cl.
H04W 4/06 (2009.01)
H04L 12/18 (2006.01)

(52) U.S. Cl.
CPC .............. *H04W 4/06* (2013.01); *H04L 12/189* (2013.01)

(58) Field of Classification Search
CPC ................................ H04L 12/189; H04W 4/06
See application file for complete search history.

(56) References Cited

U.S. PATENT DOCUMENTS

| 9,025,462 | B2 | 5/2015 | Gholmieh et al. |
| 9,173,192 | B2 | 10/2015 | Zhang et al. |
| 2007/0183434 | A1 | 8/2007 | Pandey |
| 2011/0131332 | A1* | 6/2011 | Bouazizi ............ H04L 65/1016 709/227 |

(Continued)

FOREIGN PATENT DOCUMENTS

| CN | 1981464 A | 6/2007 |
| CN | 102598722 A | 7/2012 |

(Continued)

OTHER PUBLICATIONS

International Search Report and Written Opinion—PCT/US2016/041537—ISA/EPO—dated Oct. 5, 2016.

(Continued)

Primary Examiner — Mansour Oveissi
(74) Attorney, Agent, or Firm — Arent Fox, LLP

(57) ABSTRACT

Aspects of the present disclosure provide a system, method, and apparatus for providing multimedia broadcast and multicast service (MBMS) operations in a wireless communication system. In some aspects of the present disclosure, the system, method and apparatus may provide flexibility for an application server to select one or more MBMS service delivery functionalities supported by a network device for transmission of multimedia content to a mobile device. The MBMS service delivery functionalities selected by the application server may be a subset of a plurality of MBMS service delivery functionalities supported by the network device.

16 Claims, 12 Drawing Sheets

(56) References Cited

U.S. PATENT DOCUMENTS

| | | | |
|---|---|---|---|
| 2012/0140619 A1* | 6/2012 | Chen .................. | H04W 4/06 370/229 |
| 2013/0246846 A1* | 9/2013 | Oyman ................ | H04W 80/10 714/18 |
| 2013/0294321 A1* | 11/2013 | Wang ................. | H04W 72/005 370/312 |
| 2014/0098745 A1 | 4/2014 | Balasubramanian et al. | |
| 2014/0286221 A1 | 9/2014 | Chandramouli et al. | |
| 2015/0208209 A1* | 7/2015 | Jamadagni ............ | H04W 4/06 370/312 |
| 2017/0013423 A1 | 1/2017 | Zisimopoulos et al. | |
| 2017/0078931 A1* | 3/2017 | Yoshizawa ...... | H04W 36/00837 |
| 2017/0251342 A1 | 8/2017 | Bhalla | |

FOREIGN PATENT DOCUMENTS

| | | |
|---|---|---|
| JP | 2002291011 A | 10/2002 |
| WO | 2012125976 A2 | 9/2012 |
| WO | 2013109540 A1 | 7/2013 |

OTHER PUBLICATIONS

Taiwan Search Report—TW105121790—TIPO—dated Jan. 20, 2020.

NSN: "Flow ID Allocation by BM-SC only," S2-142092, 3GPP TSG-SA WG2 #103, May 23, 2014, 4 pages, http://www.3gpp.org/ftp/tsg_sa/WG2_Arch/TSGS2_103_Phoenix/Docs/S2-142092.zip.

QUALCOMM Incorporated: "GCSE Counting using MooD Consumption Report," S2-151572, SA WG2 Meeting #109, May 25-29, 2015, Fukuoka, Japan, 6 pages, http://www.3gpp.org/ftp/tsg_sa/WG2_Arch/TSGS2_109_Fukuoka/Docs/S2-151572.zip.

3GPP TS 23.468: "3rd Generation Partnership Project, Technical Specification Group Services and System Aspects, Group Communication System Enablers for LTE (GCSE_LTE), Stage 2 (Release 13)", 3rd Generation Partnership Project (3GPP), Mobile Competence Centre, 650, Route Des Lucioles, F-06921 Sophia-Antipol Is Cedex, France, vol. SA WG2, No. V13.1.0, Jun. 16, 2015 (Jun. 16, 2015), pp. 1-30, XP050966259, [retrieved on Jun. 16, 2015] sections 5.1.2.3 and 5.1.2.4.

* cited by examiner

TECHNIQUES FOR MODULAR MULTIMEDIA BROADCAST AND MULTICAST SERVICE (MBMS) DELIVERY

CLAIM OF PRIORITY UNDER 35 U.S.C. § 120

This application is a divisional of U.S. patent application Ser. No. 15/204,802, entitled "TECHNIQUES FOR MODULAR MULTIMEDIA BROADCAST AND MULTICAST SERVICE (MBMS) DELIVERY," filed Jul. 7, 2016, which claims priority to U.S. Provisional Application No. 62/190,969, entitled "TECHNIQUES FOR MODULAR MULTIMEDIA BROADCAST AND MULTICAST SERVICE (MBMS) DELIVERY," filed Jul. 10, 2015, each of which is assigned to the assignee hereof and hereby expressly incorporated by reference herein.

BACKGROUND

The various aspects described in this disclosure relate generally to wireless communications systems, and more particularly, to techniques for multimedia broadcast and multicast service (MBMS) delivery.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., an LTE system). By way of example, a wireless multiple-access communications system may include a number of base stations, each simultaneously supporting communication for multiple communication devices, which may be otherwise known as user equipment (UEs), mobile devices or stations (STAs). A base station may communicate with the communication devices on downlink channels (e.g., for transmissions from a base station to a UE) and uplink channels (e.g., for transmissions from a UE to a base station).

During the past few decades, wireless technology has seen a tremendous growth with the introduction of high-end mobile devices. With this growth, the wireless networks have emerged from simple voice telephony networks to multimedia delivery networks where support for mobile television (TV) and radio broadcast services, for example, are expected by the mobile device end-users. In some cases, network operators have responded to this demand by subscribing to $3^{rd}$ party content providers that offer multimedia content (e.g., mobile TV). However, conventional systems of deploying these services and delivering the $3^{rd}$ party multimedia content to the one or more mobile device lack flexibility in utilization of network MBMS services.

SUMMARY

Aspects of the present disclosure provide a system, method, and apparatus for providing multimedia broadcast and multicast service (MBMS) operations in a wireless communication system. In some aspects of the present disclosure, the system, method and apparatus may provide flexibility for an application server to select one or more MBMS service delivery functionalities supported by a network device for transmission of multimedia content to a mobile device. The selected MBMS service delivery functionalities by the application server may be a subset of a plurality of MBMS service delivery functionalities supported by the network device.

In a first example, a method for MBMS operations in a wireless communication system is disclosed. The method may include receiving, at a network device, a request for activation of a service from an application server. In some aspects, the request for activation may correspond to at least one or more MBMS service delivery functionalities offered by the network device. The method may further include determining, at the network device, that the application server is authorized for the at least one or more MBMS service delivery functionalities. In some aspects, the at least one or more MBMS service delivery functionalities may be a subset of the MBMS service delivery functionalities supported by the network device. The method may further include allocating a temporary mobile group identity (TMGI) to the application server in response to a determination that the application server is authorized.

In another aspect of the first example, an apparatus for MBMS operations in a wireless communication system is disclosed. The apparatus may include a memory configured to store instructions and a processor communicatively coupled with the memory. In some examples, the processor may be configured to execute the instructions to receive, at a network device, a request for activation of a service from an application server. In some aspects, the request for activation may correspond to at least one or more MBMS service delivery functionalities offered by the network device. The processor may further be configured to determine, at the network device, that the application server is authorized for the at least one or more MBMS service delivery functionalities. In some aspects, the at least one or more MBMS service delivery functionalities may be a subset of the MBMS service delivery functionalities supported by the network device. The processor may further be configured to allocate a TMGI to the application server in response to a determination that the application server is authorized.

In another aspect of the first example, yet another apparatus for MBMS operations in a wireless communication system is disclosed. The apparatus may means for receiving, at a network device, a request for activation of a service from an application server. In some aspects, the request for activation may correspond to at least one or more MBMS service delivery functionalities offered by the network device. The apparatus may further include means for determining, at the network device, that the application server is authorized for the at least one or more MBMS service delivery functionalities. In some aspects, the at least one or more MBMS service delivery functionalities may be a subset of the MBMS service delivery functionalities supported by the network device. The apparatus may further include means for allocating a TMGI to the application server in response to a determination that the application server is authorized.

In another aspect of the first example, a computer-readable medium storing code for MBMS operations in a wireless communication system, the code comprising instructions executable to receive, at a network device, a request for activation of a service from an application server. In some aspects, the request for activation may correspond to at least one or more MBMS service delivery functionalities offered by the network device. The code may further comprise instructions executable to determine, at the network device, that the application server is authorized for the at least one or more MBMS service delivery functionalities. In some aspects, the at least one or more MBMS service delivery functionalities may be a subset of the MBMS service delivery functionalities supported by the network device. The code may further comprise instructions executable to allocate a TMGI to the application server in response to a determination that the application server is authorized.

In a second example, another method for MBMS operations in a wireless communication system is disclosed. The method may include identifying, at an application server, MBMS service delivery functionalities supported by a network device. The method may further include selecting, at the application server, at least one or more MBMS service delivery functionalities from the MBMS service delivery functionalities supported by the network device for a multimedia content associated with the application server. Additionally or alternatively, the method may include transmitting, from the application server, an activation of service request to the network device to establish communication between the application server and a UE. In some examples, the activation of service request may include the selected at least one or more MBMS service delivery functionalities for the multimedia content.

In another aspect of the second example, another apparatus for MBMS operations in a wireless communication system is disclosed. The apparatus may include a memory configured to store instructions and a processor communicatively coupled with the memory. In some examples, the processor may be configured to execute the instructions to identify, at an application server, MBMS service delivery functionalities supported by a network device. The processor may further be configured to select, at the application server, at least one or more MBMS service delivery functionalities from the MBMS service delivery functionalities supported by the network device for a multimedia content associated with the application server. Additionally or alternatively, the processor may further be configured to may include transmitting, from the application server, an activation of service request to the network device to establish communication between the application server and a UE. In some examples, the activation of service request may include the selected at least one or more MBMS service delivery functionalities for the multimedia content.

In another aspect of the second example, another apparatus for MBMS operations in a wireless communication system is disclosed. The apparatus may include means for identifying, at an application server, MBMS service delivery functionalities supported by a network device. The apparatus may further include means for selecting, at the application server, at least one or more MBMS service delivery functionalities from the MBMS service delivery functionalities supported by the network device for a multimedia content associated with the application server. Additionally or alternatively, the apparatus may include means for transmitting, from the application server, an activation of service request to the network device to establish communication between the application server and a UE. In some examples, the activation of service request may include the selected at least one or more MBMS service delivery functionalities for the multimedia content.

In another aspect of the second example, a computer-readable medium storing code for MBMS operations in a wireless communication system, the code comprising instructions executable to identify, at an application server, MBMS service delivery functionalities supported by a network device. The code may further comprise instructions executable to select, at the application server, at least one or more MBMS service delivery functionalities from the MBMS service delivery functionalities supported by the network device for a multimedia content associated with the application server. Additionally or alternatively, the code may further comprise instructions executable to transmit, from the application server, an activation of service request to the network device to establish communication between the application server and a UE. In some examples, the activation of service request may include the selected at least one or more MBMS service delivery functionalities for the multimedia content.

In a third example, another method at a UE for MBMS operations in a wireless communication system is disclosed. The method may include establishing a communication session with an application server via a network device, and receiving, at the UE, a service announcement message that includes a user service description (USD) associated with a multimedia content transmitted by the application server. In some aspects, the USD may identify at least one or more MBMS service delivery functionalities applied by a network device for the multimedia content. The method may further include requesting usage of at least one or more service delivery functionalities from a UE memory based on the USD message. In one or more examples, the at least one or more service delivery functionalities assist the UE decode the multimedia content.

In another aspect of the third example, an UE for MBMS operations in a wireless communication system is disclosed. The UE may include a memory configured to store instructions and a processor communicatively coupled with the memory. In some examples, the processor may be configured to execute the instructions to establish a communication session with an application server via a network device, and receive, at the UE, a service announcement message that includes a USD associated with a multimedia content transmitted by the application server. The processor may be further configured to request usage of at least one or more service delivery functionalities from a UE memory based on the USD message. In one or more examples, the at least one or more service delivery functionalities assist the UE decode the multimedia content.

In another aspect of the third example, another apparatus for MBMS operations in a wireless communication system is disclosed. The apparatus may include means for establishing a communication session with an application server via a network device, and means for receiving, at the UE, a service announcement message that includes a USD associated with a multimedia content transmitted by the application server. In some aspects, the USD may identify at least one or more MBMS service delivery functionalities applied by a network device for the multimedia content. The apparatus may further include means for requesting usage of at least one or more service delivery functionalities from a UE memory based on the USD message. In one or more examples, the at least one or more service delivery functionalities assist the UE decode the multimedia content.

In another aspect of the third example, a computer-readable medium storing code for MBMS operations in a wireless communication system, the code comprising instructions executable to establish a communication session with an application server via a network device, and receive, at the UE, a service announcement message that includes a USD associated with a multimedia content transmitted by the application server. In some aspects, the USD may identify at least one or more MBMS service delivery functionalities applied by a network device for the multimedia content. The code may further comprise instructions executable to request usage of at least one or more service delivery functionalities from a UE memory based on the USD message. In one or more examples, the at least one or more service delivery functionalities assist the UE decode the multimedia content.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional component, and in which.

DETAILED DESCRIPTION

Figure 1:
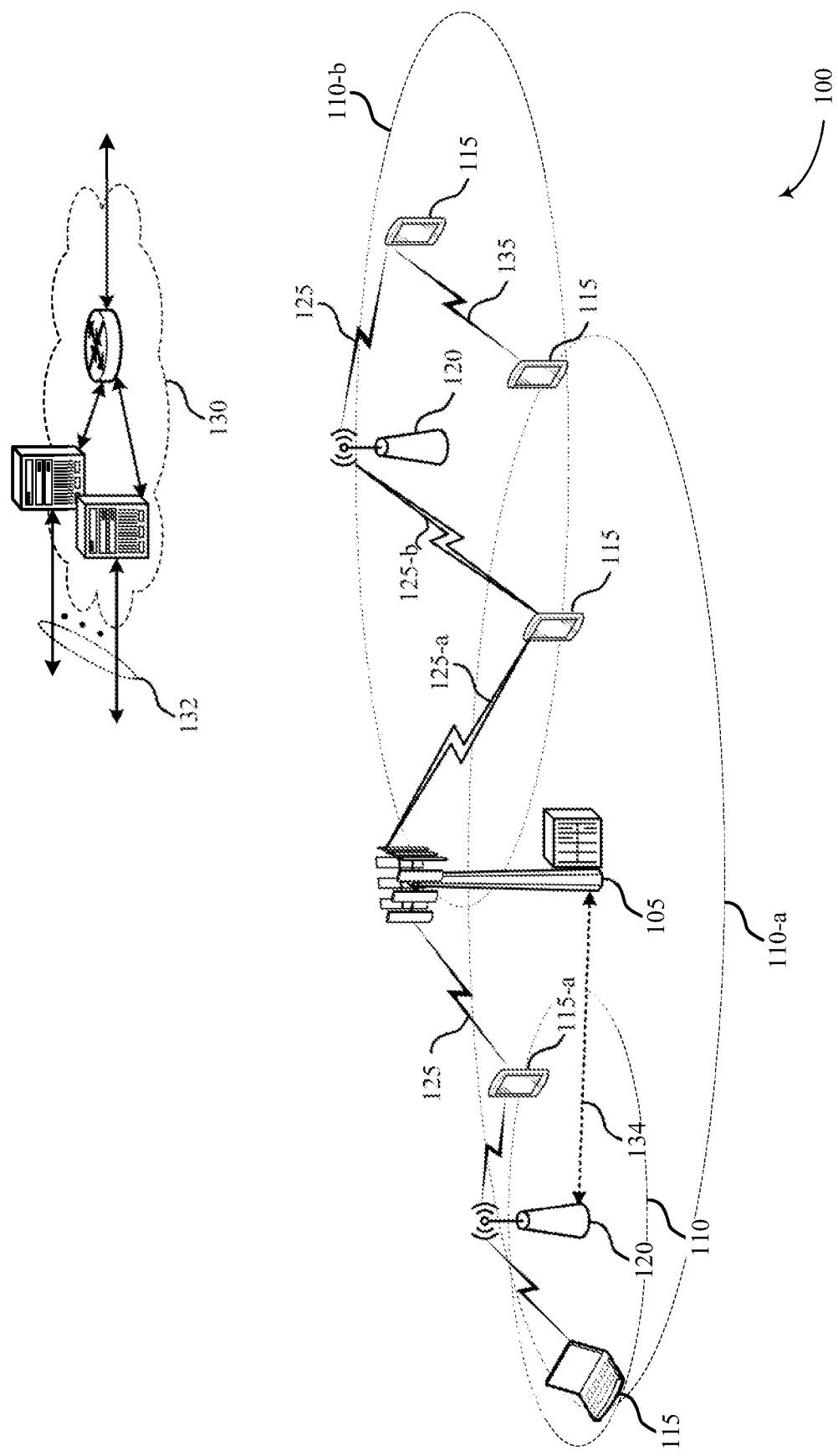
FIG. 1 illustrates an example of a wireless communications system for MBMS service delivery in accordance with various aspects of the present disclosure.

Various aspects are now described with reference to the drawings. In the following description, for purposes of explanation, numerous specific details are set forth to provide a thorough understanding of one or more aspects. It should be understood, however, that such aspect(s) may be practiced without these specific details. Also, as used herein, a component may be one of the parts that make up a system, may be hardware or software, and may be divided into other components.

The increasing popularity of mobile TV and radio services may lead to situations in which many users may want to watch the same content at the same time. Examples may include, but not limited to, live sporting events (e.g., football or soccer games). For such instances, multicasting and/or broadcasting the multi-media content from a single source to multiple mobile devices may be a more appropriate utilization of spectral resources. Multimedia Broadcast and Multicast Service (MBMS) offers these functionalities at a relatively low cost. In some aspects, MBMS functionality may be introduced to the network architecture with only minor changes to the existing radio and core network protocols.

MBMS architecture may comprise two components: MBMS transport and MBMS service delivery. MBMS transport functionality may provide transport bearers, for example, over which internet protocol (IP) multicast packets can be delivered to one or more mobile devices. Additionally or alternatively, MBMS service delivery functionality may include services such as content protection, bootstrapping, file repair, reporting, or a combination thereof for the delivery of multimedia files and streams on top of the IP multicast bearers.

As part of the MBMS transport functionality, MBMS may support two basic transmission modes for delivering IP packets from the network to the one or more mobile devices: MBMS broadcast mode and/or MBMS multicast mode. The MBMS broadcast mode may be used for delivering IP packets to all terminals in a certain area or the whole network. If the MBMS broadcast mode is used, a transmission bearer may be setup for all cells in which the service may be available. In the broadcast mode, MBMS need not require an uplink connection and can thus be used as a "downlink-only" broadcast technology.

In MBMS multicast mode, a mobile device that wants to receive information related to particular multicast channels "joins" one or several content channels (e.g., expresses interest to receive content associated with this channel). This information may be processed in the routing layer of the core network and used for optimizing the data delivery path. In various aspects, MBMS may support range from multicast/broadcast transmission in a single cell, over locally restricted areas (e.g., Washington D.C., metro area) to a nationwide, single frequency network, broadcasting the same content (e.g., TV channels) across the whole country. In a single frequency network (SFN), all cells may use the same carrier frequency. Thus, in some aspects, the mobile devices may be able to receive signals from multiple adjacent cells simultaneously. This feature may lead to significant increase in spectral efficiency and thereby throughput on the radio resources.

In accordance with various aspects of the present disclosure, a third (3rd) party application server may flexibly select a subset of the MBMS service delivery functionalities supported by a network device for the multimedia content transmitted by the application server to a mobile device. For example, an application server may choose to have the network entity perform a limited or reduced set of MBMS service delivery functionalities (e.g., file repair or content protection) while excluding other MBMS service delivery functionalities (e.g., bootstrapping and/or service reporting).

FIG. 1 illustrates an example of a wireless communications system for MBMS service delivery in accordance with various aspects of the present disclosure. The wireless communications system 100 includes base stations 105, small cell access points (AP) 120, mobile devices 115, and a core network 130. In some aspects of the present disclosure, the base station 105 may be referred to as a macro cell base station, and AP 120 may be referred to as small cell base station. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 and AP 120 may perform radio configuration and scheduling for communication with the mobile devices 115, or may operate under the control of a base station controller (not shown). In various examples, the base station 105 and AP 120 may communicate, either directly or indirectly (e.g., through core network 130), with each other over backhaul links 134 (e.g., X2, Over-the-air (OTA) etc.), which may be wired or wireless communication links. In some aspects of the present disclosure, the base station 105 and AP 120 may share their respective timing parameters associated with communication scheduling.

The base station 105 and AP 120 may wirelessly communicate with the mobile device 115 via one or more antennas. Each of the base station 105 and AP 120 may provide communication coverage for a respective geographic coverage area 110. In some examples, base station 105 may be referred to as a base transceiver station, a radio base station, an access point, a radio transceiver, a NodeB, eNodeB (eNB), Home NodeB, a Home eNodeB, or some other suitable terminology. The geographic coverage area 110-a for a base station 105 and geographic coverage area 110-b for AP 120 may be divided into sectors making up only a portion of the coverage area (not shown). The wireless communications system 100 may include base station 105 and AP 120 of different types (e.g., macro or small cell base stations). There may be overlapping geographic coverage areas 110 for different technologies.

While the mobile devices 115 may communicate with each other through the base station 105 and AP 120 using communication links 125, each mobile device 115 may also communicate directly with one or more other mobile devices 115 via a direct wireless link 135. Two or more mobile devices 115 may communicate via a direct wireless link 135 when both mobile devices 115 are in the geographic coverage area 110 or when one or more mobile devices 115 are within the AP geographic coverage area 110-b. Examples of direct wireless link 135 may include Wi-Fi Direct connections, connections established using a Wi-Fi Tunneled Direct Link Setup (TDLS) link, and other P2P group connections. In other implementations, other peer-to-peer connections or ad hoc networks may be implemented within the wireless communications system 100.

In some examples, the wireless communications system 100 includes a wireless wide area network (WWAN) such as an LTE/LTE-Advanced (LTE-A) network. In LTE/LTE-A networks, the term evolved node B (eNB) may be generally used to describe the base stations 105, while the term user equipment (UEs) may be generally used to describe the mobile devices 115. The wireless communications system 100 may include a heterogeneous LTE/LTE-A network in which different types of eNBs provide coverage for various geographical regions. The wireless communications system 100 may, in some examples, also support a wireless local area network (WLAN). A WLAN may be a network employing techniques based on the Institute of Electrical and Electronics Engineers (IEEE) 802.11x family of standards ("Wi-Fi"). In some examples, each eNB or base station 105 and AP 120 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by mobile device 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by mobile device 115 with service subscriptions with the network provider. A femto cell may also cover a small geographic area (e.g., a home) and may provide restricted access by mobile device 115 having an association with the femto cell (e.g., mobile device 115 in a closed subscriber group (CSG), mobile device 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). In some aspects of the present disclosure, the base station 105 may be referred to as a macro cell base station, and AP 120 may be referred to as small cell base station.

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a mobile device 115 and the base stations 105. The RRC protocol layer may also be used for core network 130 support of radio bearers for the user plane data. At the physical (PHY) layer, the transport channels may be mapped to physical channels.

The mobile devices 115 may be dispersed throughout the wireless communications system 100, and each mobile device 115 may be stationary or mobile. A mobile device 115 may also include or be referred to by those skilled in the art as a user equipment (UE), mobile station, a subscriber station, STA, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless modem, a wireless communication device, a handheld device, a tablet computer, a laptop computer, a cordless phone, a wireless local loop (WLL) station, or the like. A mobile device may be able to communicate with various types of base stations and network equipment including macro eNBs, small cell eNBs, relay base stations, and the like. In some examples, a dual-radio UE 115-a, may include a WLAN radio (not shown) and a WWAN radio (not shown) that may be configured to concurrently communicate with base station 105 (using the WWAN radio) and with AP 120 (using the WLAN radio).

The communication links 125 shown in wireless communications system 100 may include uplink (UL) transmissions from a mobile device 115 to a base station 105 or AP 120, or downlink (DL) transmissions, from a base station 105 or AP 120 to a mobile device 115. The downlink transmissions may also be called forward link transmissions while the uplink transmissions may also be called reverse link transmissions. Each communication links 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The communication links 125 may utilize resources of licensed spectrum or unlicensed spectrum, or both. Broadly speaking, the unlicensed spectrum in some jurisdictions may range from 600 Megahertz (MHz) to 6 Gigahertz (GHz), but need not be limited to that range. As used herein, the term "unlicensed spectrum" or "shared spectrum" may thus refer to industrial, scientific and medical (ISM) radio bands, irrespective of the frequency of those bands. An "unlicensed spectrum" or "shared spectrum" may refer to a spectrum used in a contention-based communications system. In some examples, unlicensed spectrum is the U-NII radio band, which may also be referred to as the 5 GHz or 5G band. In some aspects, the "unlicensed spectrum" may include spectrum that may be reserved for mission critical devices (e.g., radar and non-civilian systems).

Wireless communications system 100 may also support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A mobile device 115 may be configured with multiple downlink CCs and one or more uplink CCs for carrier aggregation. Carrier aggregation may be used with both FDD and TDD component carriers.

In accordance with aspects of the present disclosure, one or more UEs 115 may subscribe to multimedia content subscription broadcasted on the network from an application server. In some aspects, the application server may be part of the core network 130 or a $3^{rd}$ party application server in communication with the core network 130. In some examples, the multimedia content may be transmitted from the core network 130 to the one or more UEs 115 utilizing MBMS service delivery functionalities provided by the core network 130. For example, the core network 130 may include a network device (e.g., Broadcast Multicast Service Center (BM-SC) 226 (FIG. 2)) that may support a plurality of MBMS service delivery functionalities (e.g., content protection, file repairing, bootstrapping etc.) Thus, in some examples, the network device may select a subset of the MBMS service delivery functionalities supported by the BM-SC 226 for transmitting multimedia content (e.g., mobile TV) to the one or more UEs 115.

Figure 2:
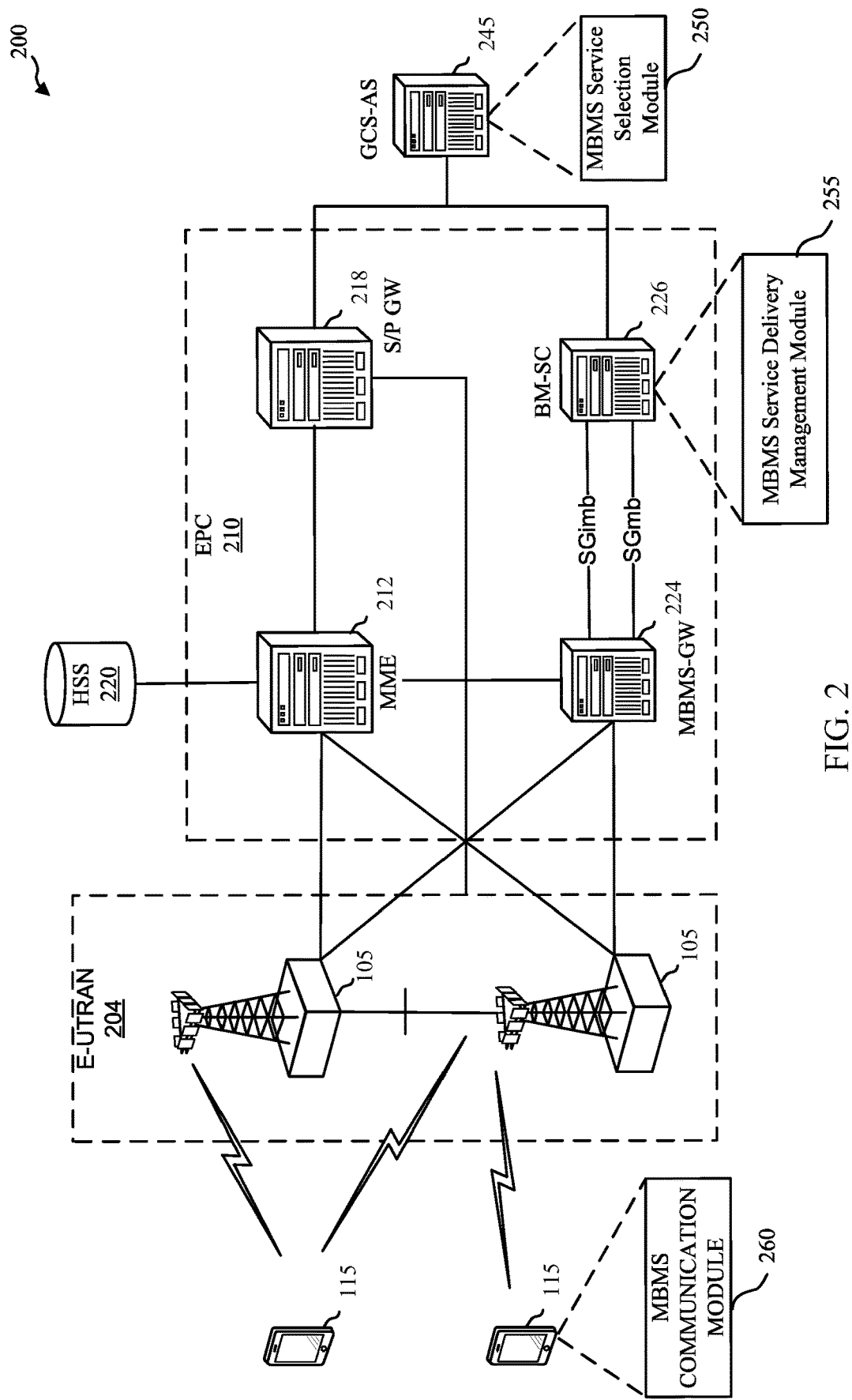
FIG. 2 is a diagram illustrating network architecture in accordance with aspects of the present disclosure.

FIG. 2 is a diagram illustrating network architecture in accordance with aspects of the present disclosure. The network architecture may be referred to as an Evolved Packet System (EPS) 200 and may be an example of wireless communications system 100 illustrated in FIG. 1. The EPS 200 may include one or more user equipments (UEs) 115, an Evolved UMTS Terrestrial Radio Access Network (E-UTRAN) 204, an Evolved Packet Core (EPC) 210, and an Operator's Internet Protocol (IP) Services (e.g., group communication system application server (GCS-AS) 245. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 105 and other eNBs 105, and may include a Multicast Coordination Entity (MCE). The eNB 105 provides user and control planes protocol terminations toward the UE 115. The eNB 105 may be connected to the other eNBs 105 via a backhaul (e.g., an X2 interface). The MCE allocates time/frequency radio resources for evolved Multimedia Broadcast Multicast Service (MBMS) (eMBMS), and determines the radio configuration (e.g., a modulation and coding scheme (MCS)) for the eMBMS. The MCE may be a separate entity or part of the eNB 105. The eNB 105 may also be referred to as a base station, a Node B, an access point, a base transceiver station, a radio base station, a radio transceiver, a transceiver function, a basic service set (BSS), an extended service set (ESS), or some other suitable terminology. The eNB 105 provides an access point to the EPC 210 for a UE 115. In some aspects, the UEs 115 may include MBMS communication component 260 to execute one or more functions of the present disclosure (e.g., FIG. 5).

The eNB 105 is connected to the EPC 210. The EPC 210 may be part of the core network 130 (see FIG. 1) and may include a Mobility Management Entity (MME) 212, a Home Subscriber Server (HSS) 220, a Multimedia Broadcast Multicast Service (MBMS) Gateway 224, a Broadcast Multicast Service Center (BM-SC) 226, and a Serving/Packet Data Network (PDN) Gateway 218. The MME 212 is the control node that processes the signaling between the UE 115 and the EPC 210. Generally, the MME 212 provides bearer and connection management. All user IP packets are transferred through the S/P Gateway 218. The S/P Gateway 218 provides UE IP address allocation as well as other functions. The BM-SC 226 is connected to the IP Services that may include one or more application servers (e.g., GCS-AS 245). In some examples, an IP service such as GCS-AS 245 may be operated and/or managed by a 3$^{rd}$ party. Additionally or alternatively, the GCS-AS 245, in some examples, may be operated by the network operator (e.g., operator of core network 130). In some examples, the BM-SC 226 may include a MBMS service delivery management component 255 for performing one or more methods for BM-SC 226 described herein.

In some aspects, a GCS-AS 245 may include MBMS service selection component 250 configured to perform one or more functions of the present disclosure. In some examples, the IP Services may include the Internet, an intranet, an IP Multimedia Subsystem (IMS), a PS Streaming Service (PSS), and/or other IP services. In some aspects, the BM-SC 226 may provide functions for MBMS user service provisioning and delivery. The BM-SC 226 may serve as an entry point for content provider MBMS transmission, may be used to authorize and initiate MBMS Bearer Services within a PLMN, and may be used to schedule and deliver MBMS transmissions. The MBMS Gateway 224 may be used to distribute MBMS traffic to the eNBs 105 belonging to a Multicast Broadcast Single Frequency Network (MBSFN) area broadcasting a particular service, and may be responsible for session management (start/stop) and for collecting eMBMS related charging information.

Figure 3A:
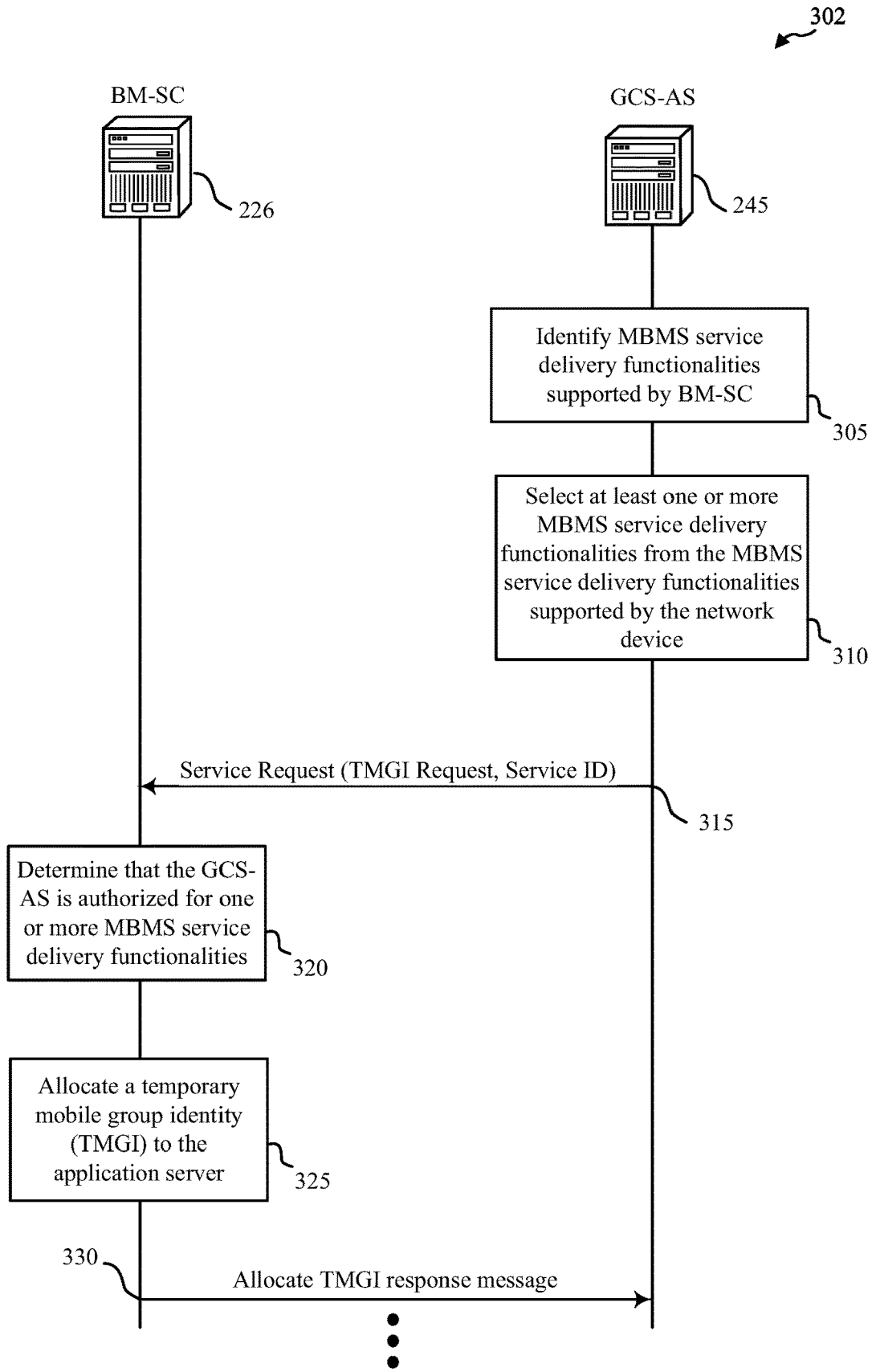
FIG. 3A and FIG. 3B illustrate an example of methods of wireless communication between a network device and the application server in accordance with aspects of the present disclosure.
Figure 3B:
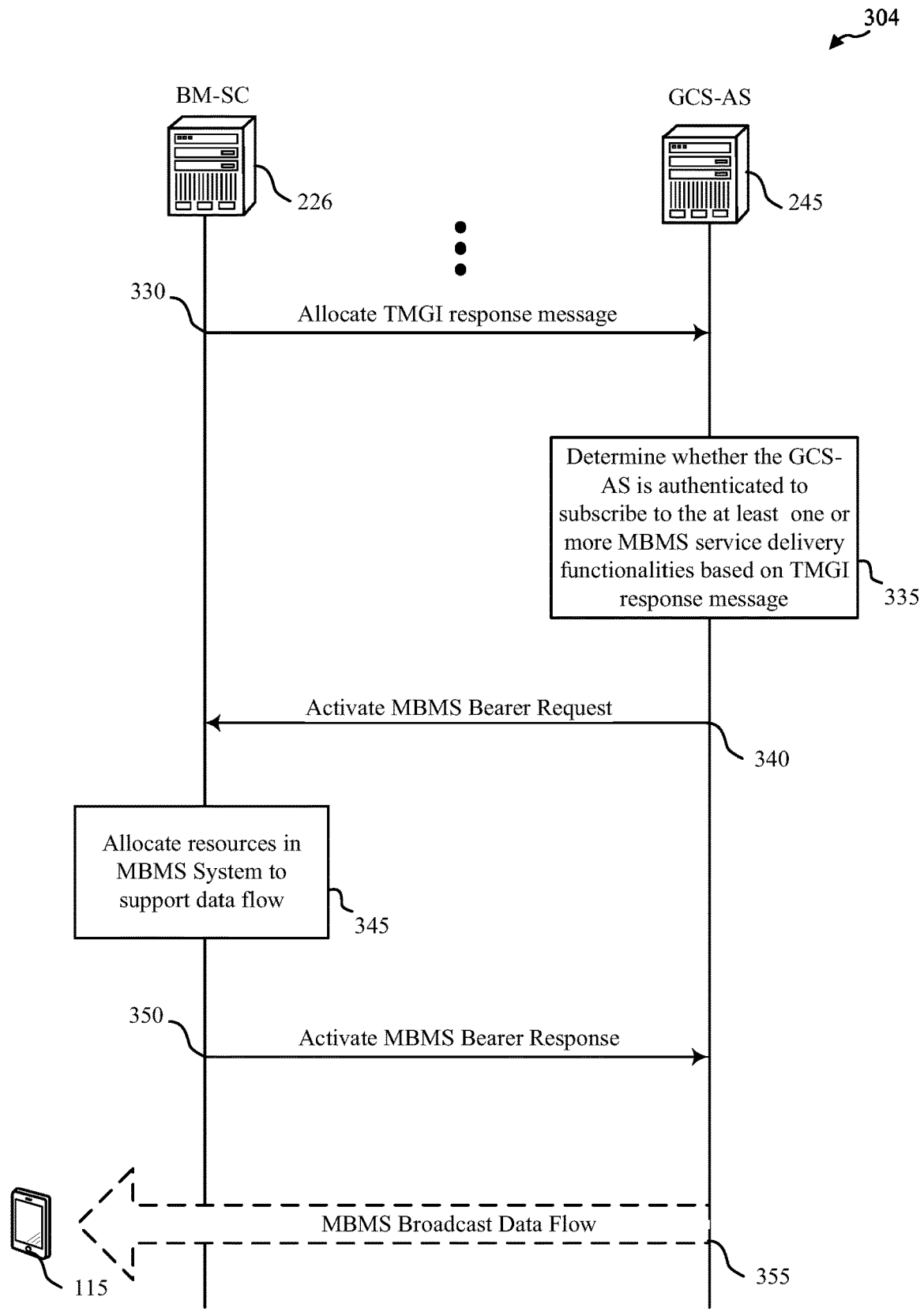

FIG. 3A and FIG. 3B illustrate communication example of methods 302 and 304 of wireless communication between BM-SC 226 and GCS-AS 245, in accordance with aspects of the present disclosure. The BM-SC 226 and GCS-AS 245 may be an example of BM-SC 226 and GCS-AS 245 described with reference to FIG. 2.

Turning first to FIG. 3A, at 305, the GCS-AS 245 may identify one or more MBMS service delivery functionalities supported by BM-SC 226. At 310, the GCS-AS 245 may select at least one or more MBMS service delivery functionalities from the MBMS service delivery functionalities supported by the network device. At 315, the GCS-AS 245 may transmit a service request message to the BM-SC 226. In some examples, the service request message may be an activation of a service request from the GCS-AS 245 to the BM-SC 226 to establish communication between the application server and a UE 115. In some examples, the service request may include the selected MBMS service delivery functionalities that correspond to at least one or more MBMS service delivery functionalities supported by the BM-SC 226.

At 320, the BM-SC 226 may determine that the GCS-AS 245 is authorized for the one or more MBMS service delivery functionalities based on an agreement between a network operator and an operator of the application server. The BM-SC 226 may allocate, at 325 a temporary mobile group identity (TMGI) to the GCS-AS 245. In some examples, the BM-SC 226, at 330, may transmit an allocate TMGI response message to the GCS-AS 245 that identifies whether the GCS-AS 245 is authorized to access the one or more MBMS service delivery functionalities requested.

Turning next to FIG. 3B, in continuation from 330 in FIG. 3A, the GCS-AS 245, at 335, upon receiving the allocate TMGI response message from the BM-SC 226, determines whether the GCS-AS 245 is authenticated to subscribe to the at least one or more MBMS service delivery functionalities based on the TMGI response message. Accordingly, at 340, the GCS-AS 245 may transmit an activate MBMS bearer request to the BM-SC 226 to establish an MBMS bearer service between the GCS-AS 245 and the UE 115 via BM-SC 226 if the BM-SC 226 determines that the GCS-AS 245 is authenticated to subscribe to at least one or more MBMS service delivery functionalities. At 345, the BM-SC 226 may allocate resources (e.g., bearer resources) in MBMS system to support data flow from the GCS-AS 245 to the one or more UEs 115.

At 350, the BM-SC 226 may transmit an activate MBMS bearer response to the BM-SC 226 to identify that an MBMS bearer service has been setup between the GCS-AS 245 and the UE 115. Accordingly, at 355, the GCS-AS 245 may initiate transmitting MBMS broadcast data flow (e.g., multimedia content) to the one or more UEs 115 via the MBMS bearers established by the BM-SC 226 using the allocated resources.

Figure 4A:
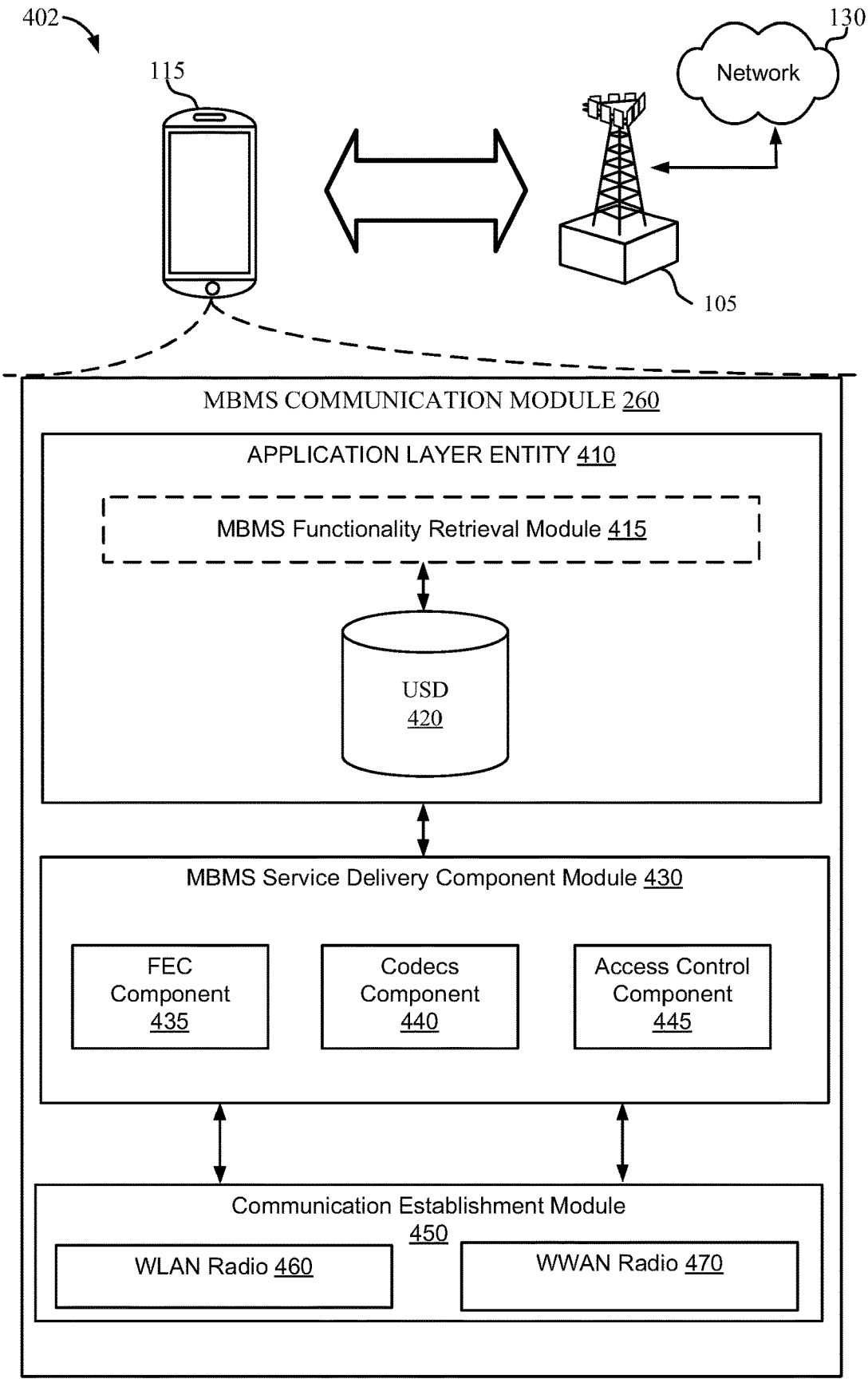
FIG. 4A and FIG. 4B illustrate examples of a schematic diagram of a user equipment (UE) comprising various components and sub-components in accordance with various aspects of the present disclosure.
Figure 4B:
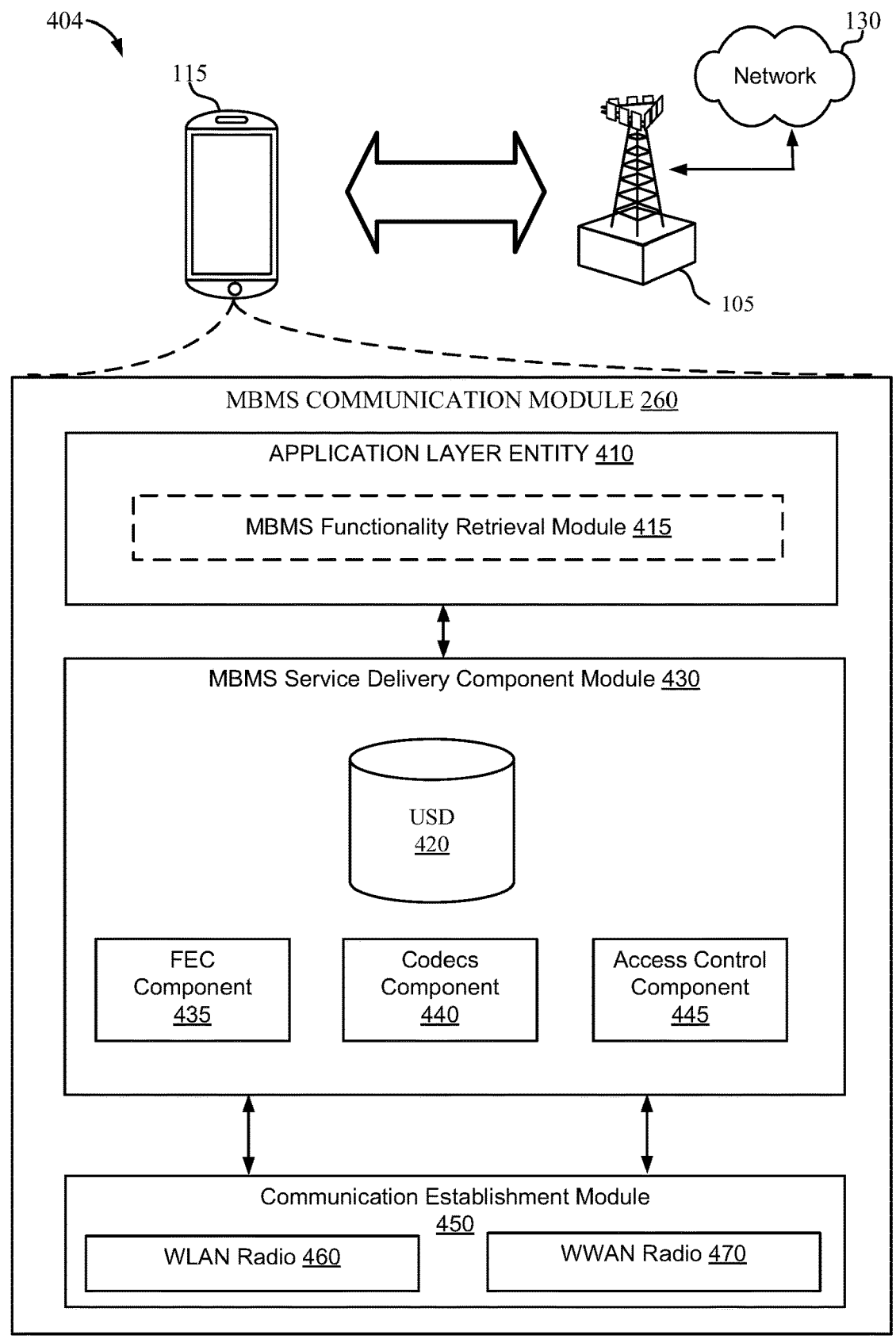

FIG. 4A and FIG. 4B show a block diagram 402 and 404, respectively, of a UE 115 comprising an MBMS communication component 260 configured to execute aspects of the present disclosure. In some examples, the UE 115 may be an example of one or more UEs 115 described with reference to FIGS. 1-2. Functions and methods described with reference to MBMS communication component 260 may be performed by a processor (e.g., processor 712 in FIG. 7) or a separate processor implement in the UE 115. The MBMS communication component 260 may communicate with the computer-readable medium (e.g., memory 716) via bus 744 (see FIG. 7). In some aspects, the UE 115 may communicate with the core network 130 via one or more base stations 105.

Turning first to FIG. 4A, the MBMS communication component 260 may include an application layer entity 410 that may be configured to allow the user to subscribe to media content (e.g., mobile TV) from the GCS-AS 245. In some examples, the application layer entity 410 may include an MBMS functionality retrieval component 415 in communication with the user service description (USD) component 420. In some aspects, the MBMS functionality retrieval component 415 may request usage of at least one or more service delivery functionalities from a UE memory (e.g., computer-readable medium 706). In some examples, the MBMS service functionalities may be stored in the MBMS service deliver component component 430 that may include a forward error correction (FEC) component 435, codecs component 440, and access control component 440. Although only three MBMS service delivery components are illustrated in FIGS. 4A and 4B, it should be appreciated by those skilled in the art that any number of MBMS service delivery functionalities may be available. In some examples, the MBMS service delivery component component 430 may assist the application layer entity 410 decode the multimedia content received from the GCS-AS 245.

The MBMS communication component 260 may further include a communication establishment component 450 that may correspond with the transceiver 710 (see FIG. 7) for establishing and carrying out communication with the network device and/or one or more UEs 115. The communication establishment component 450 may include a WLAN radio 460 and/or WWAN radio 470 to communicate with the network over one or more communication links (e.g., communication links 125-a and 125-b). In some examples, the functionalities of the WLAN radio 460 and/or WWAN radio 470 may be partially implemented in the transceiver 702 and the RF front end 788 of FIG. 7.

In accordance with aspects of the present disclosure, the application layer entity 410 may receive user service description (USD) message from a lower layer (e.g., the physical layer in open systems interconnection (OSI) stack) that is transmitted by the network device (e.g., BM-SC 226). Accordingly, the application layer entity 410 may unpack the USD message to process the multimedia data associated with the USD message. In some examples, the USD message may contain multiple metadata fragments corresponding to different components of the MBMS service description. In one or more examples, the metadata fragments may comprise a metadata fragment object describing details of a single or a bundle of MBMS user services. In other examples, the metadata fragment objects may describe details of associated delivery methods, service protection, FEC repair data stream, media presentation description, and/or scheduling information description. In some aspects, the one or more metadata fragments may be part of one or more MBMS service delivery components (e.g., FEC component 435, codecs component 440, and/or access control component 445). Thus, in some aspects, the metadata fragments may not be associated in a one-to-one correspondence with the one or more MBMS service delivery components.

In the example of FIG. 4A, the application layer entity 410 is provided with the USD component 420 associated with the multimedia content. Thus, when the application layer entity 410 receives a USD message associated with a specific service selected by the GCS-AS 245, the USD message may identify one or more MBMS service delivery components (e.g., FEC component 435, codecs component 440, and access control component 445) that may be required for a specific service. Accordingly, the application layer entity 410 may request the MBMS service delivery component component 430 to provide access to the one or more MBMS service delivery functionalities stored in the one or more MBMS service delivery components in order to assist the application layer entity 410 decode the multimedia content broadcasted by the GCS-AS 245.

Alternatively, as illustrated in FIG. 4B, the USD component 420 may be part of the MBMS service delivery component component 430. In such instance, the application layer entity 410 may receive a service identification (ID) associated with the activation of one or more MBMS services. When the application layer entity 410 receives a service ID associated with a multimedia content transmitted by the GCS-AS 245, the MBMS functionality retrieval component 415 may request the MBMS service delivery component component 430 to correlate the service ID against the USD component 420 to determine one or more MBMS service delivery components (e.g., FEC component 435, codecs component 440, and/or access control component 445) that may correspond with the specified service ID. As a result, the MBMS service delivery component component 430 may transmit the requested MBMS service component functionalities to the MBMS functionality retrieval component 415 to assist the application layer entity 410 to decode the multimedia content.

Figure 5:
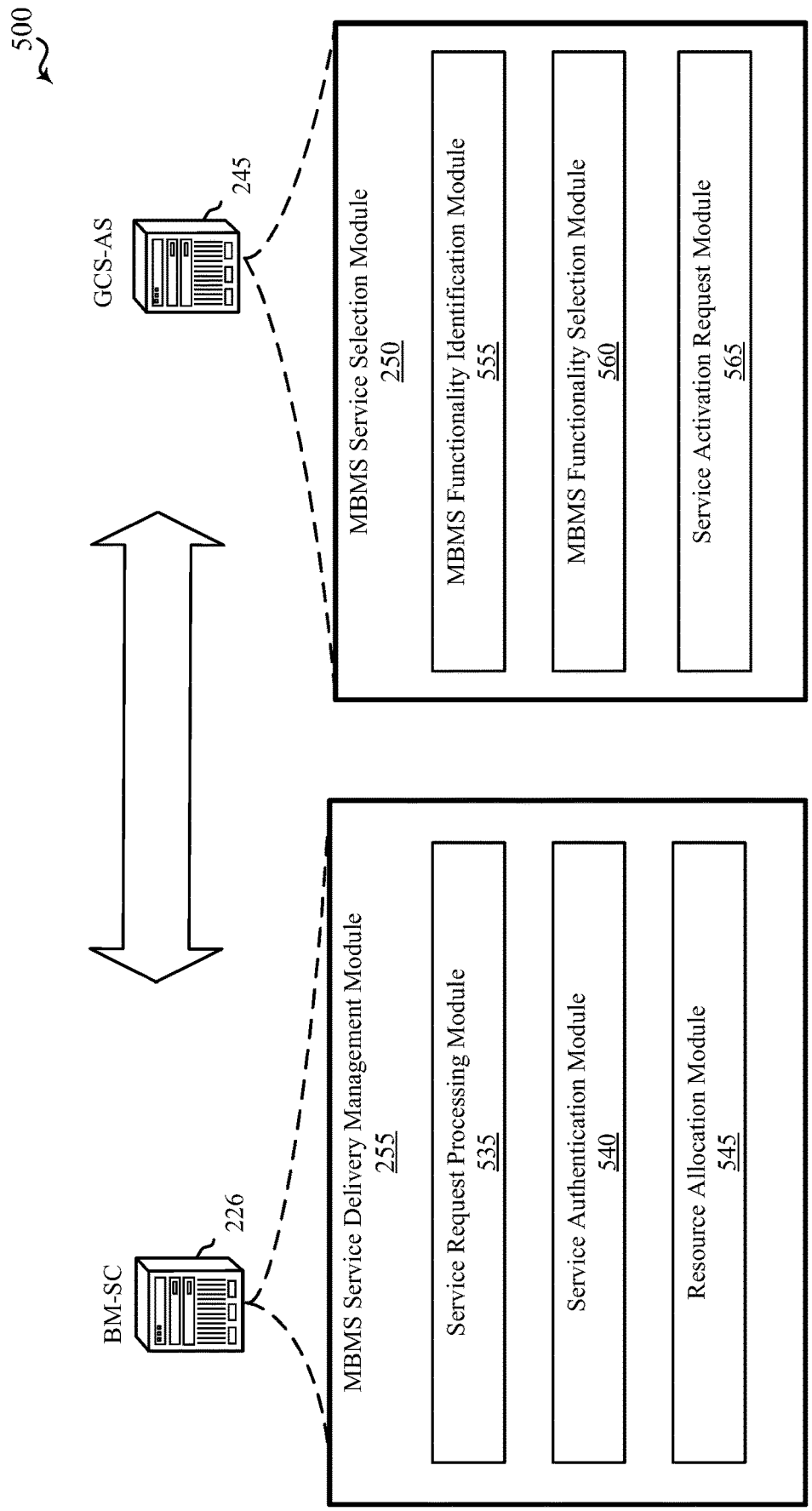
FIG. 5 illustrates an example of a schematic diagram of a network device and application server comprising various components and subcomponents in accordance with various aspects of the present disclosure.

FIG. 5 shows a block diagram of BM-SC 226 in communication with a GCS-AS 245. In some examples, the BM-SC 226 may include a MBMS service delivery management component 255 for providing one or more MBMS service delivery functionalities to the GCS-AS 245. Additionally or alternatively, GCS-AS 245 may include an MBMS service selection component 250 for selecting at least one or more MBMS service delivery functionalities supported by the BM-SC 226 for a multimedia content associated with the GCS-AS 245. It is contemplated that techniques described with reference to MBMS service delivery management component 255 and MBMS service selection component 250 may be implemented using a processor (e.g., processor 604) and a memory (e.g., computer-readable medium 606) as described in reference to FIG. 6.

In some examples, the MBMS service selection component 250 may include an MBMS functionality identification component 555 for identifying, at an application server, MBMS service delivery functionalities supported by a network device (e.g., BM-SC 226). In some examples, the MBMS service delivery functionalities supported by the BM-SC 226 may include content access control functionality, bootstrapping functionality, file repair functionality, reporting functionality, or a combination thereof.

From the list of MBMS service delivery functionalities supported by the BM-SC 226, a MBMS functionality selection component 560 associated with the MBMS service selection component 250 may select at least one or more MBMS service delivery functionalities. In some examples, the one or more MBMS service delivery functionalities selected by the MBMS functionality selection component 560 may be a subset of all the MBMS service delivery functionalities supported by the network device (e.g., selecting FEC and codecs functionalities).

Based on the MBMS service delivery functionality selections, a service activation request component 565 may transmit, the GCS-AS 245, an activation of service request to the BM-SC 226 to establish communication between the application server and a UE 115. In some examples, the activation of service request may include the selected at least one or more MBMS service delivery functionalities for the multimedia content.

Accordingly, a service request processing component 535 associated with the BM-SC 226 may receive and process the activation of service request from the GCS-AS 245. The service authentication component 540 may determine whether the GCS-AS 245 is authorized for the at least one or more MBMS service delivery functionalities. As discussed above, the one or more MBMS service delivery functionalities requested in the activation of the service request message may be a subset of the MBMS service delivery functionalities supported by the BM-SC 226. In some examples, determining that the GCS-AS 245 is authorized for the at least one or more MBM service delivery functionalities requested by the GCS-AS 245 may include identifying a service ID in the request for the activation of the service and determining whether the service ID corresponds to an authorized service offering for the GCS-AS 245 based on an agreement between a network operator and an operator of the GCS-AS 245.

In one or more examples, the service ID associated with the activation of service request may specify a first MBMS service delivery functionality (e.g., FEC) supported by the network device to be included in the activation of service, and a second MBMS service delivery functionality (e.g., codecs) of the MBMS service delivery functionalities supported by the network device to be excluded from the request.

In some examples, the resource allocation component 545 may allocate a temporary mobile group identity (TMGI) to the GCS-AS 245 based on determining that the GCS-AS is authorized for the one or more MBMS service delivery functionalities. As a result, the MBMS service delivery management component 255 may transmit a service announcement message associated with a multimedia content to a UE that includes a user service description (USD) identifying the required MBMS service delivery functionalities for the requested service(s). In some examples, the MBMS service delivery management component 255 may establish communication between the GCS-AS 245 and the UE 115 by configuring, at the BM-SC 226, the at least one or more MBMS service delivery functionalities for a multimedia content transmitted from the application server to the UE 115. In some aspects, establishing communication between the application server and the UE 115 by the BM-SC may include activating an MBMS bearer between the application server and the UE 115.

Figure 6:
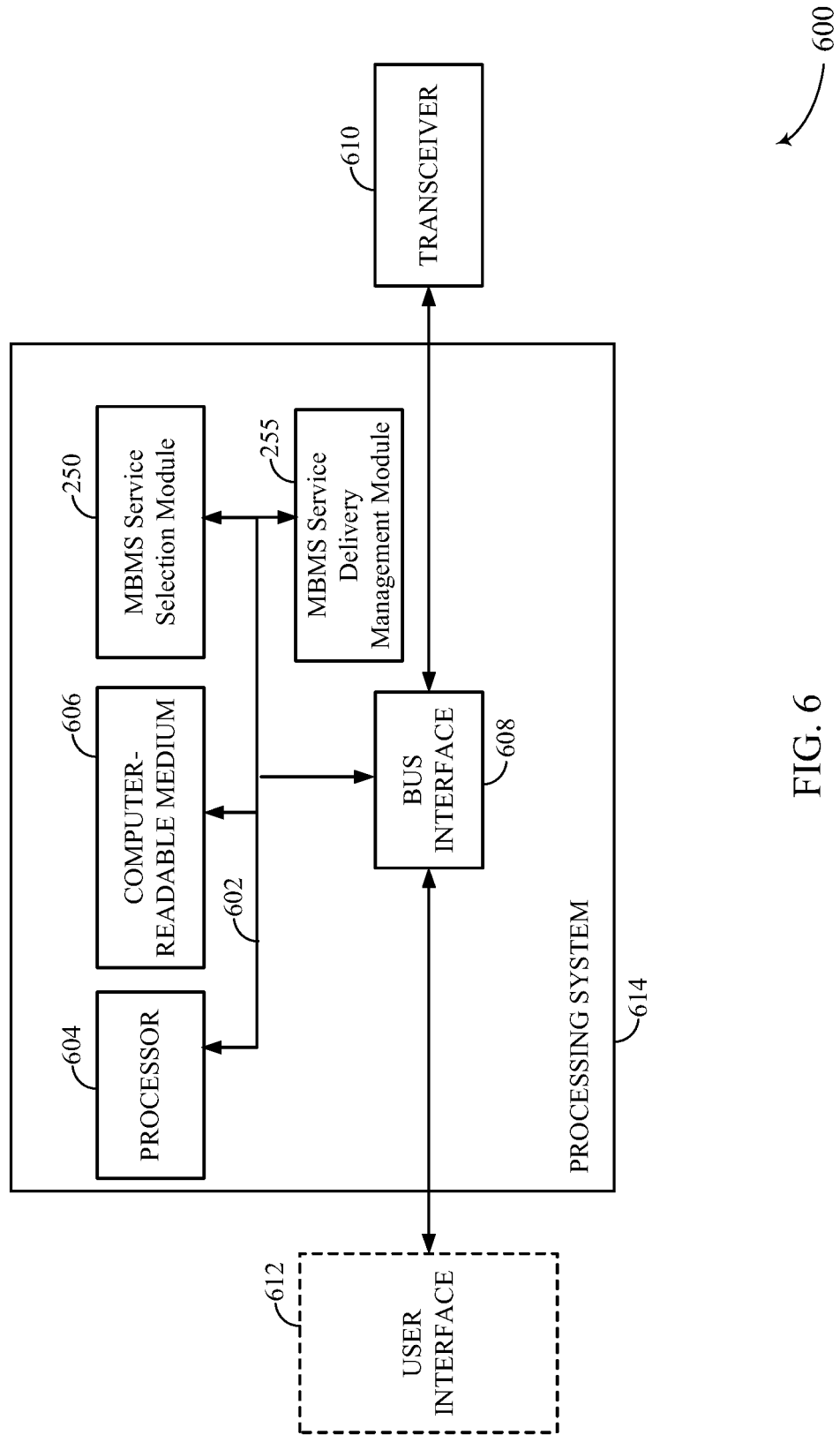
FIG. 6 is a diagram illustrating an example of a hardware implementation for an apparatus employing a processing system.

FIG. 6 is a conceptual diagram illustrating an example of a hardware implementation for an apparatus 600 employing a processing system 614. In some examples, the processing system 614 may be an example of a BM-SC 226 or GCS-AS 245 described with reference to FIG. 2. That is, the processing system 614 may be a representation of a hardware implementation used for the BM-SC 226 or the GCS-AS 245. In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors, represented generally by the processor 604, computer-readable media, represented generally by the computer-readable medium 606, MBMS service selection component 250, and/or MBMS service delivery management component 255, which may be configured to carry out one or more methods or procedures described herein.

In some instances, the MBMS service selection component 250 may be implemented when processing system 614 is used in a GCS-AS 245. In other instances, the MBMS service delivery management component 255 may be implemented when processing system 614 is used in a BM-SC 226. In an aspect, MBMS service selection component 250 and/or MBMS service delivery management component 255, and the components therein may comprise hardware, software, or a combination of hardware and software that may be configured to perform the functions, methodologies (e.g., method 302 of FIG. 3, 304 of FIG. 4, method 800 of FIG. 8 and/or method 900 of FIG. 9), or methods presented in the present disclosure.

The bus 602 may also link various other circuits such as timing sources, peripherals, voltage regulators and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided. In the instance that processing system 614 operates as a BM-SC 226, the transceiver 610 may be configured to receive a request for activation of a service from an application server indicated when the processing system 614 functions as a BM-SC 226. In some aspects, the request for activation may correspond to at least one or more MBMS service delivery functionalities offered by the network device. The transceiver 610 may further be configured to transmit a TMGI allocation message to the GCS-AS 245.

Alternatively, in the instance that the processing system 614 operates as a GCS-AS 245, the transceiver 610 may be configured to transmit, from the application server, an activation of service request to the network device to establish communication between the application server and UE. In some examples, the service request includes a request for at least one or more MBMS service delivery functionalities for the multimedia content.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software. In some aspects, at least a portion of the functions, methodologies, or methods associated with the MBMS service selection component 250 and/or MBMS service delivery management component 255 may be performed or implemented by the processor 604 and/or the computer-readable medium 606.

In some examples, the computer-readable medium 606 may store code for wireless communications. As discussed above, in the instance that the processing system 614 operates as a BM-SC 226, the code may comprise instructions executable by a computer (e.g., processor 604) to determine, at the network device, whether the application server is authorized for the at least one or more MBMS service delivery functionalities. In some aspects, the at least one or more MBMS service delivery functionality may be a subset of the MBMS service delivery functionalities supported by the network device. The code may further comprise instructions executable by the computer (e.g., processor 604) to allocate a TMGI to the application server based on determining that the application server is authorized for the at least one or more MBMS service delivery functionalities.

In the instance that the processing system 614 operates as a GCS-AS 245, the code may comprise instructions executable by the computer (e.g., processor 604) to identify, at an application server, MBMS service delivery functionalities supported by a network device. The code may further include selecting, at the application server, at least one or more MBMS service delivery functionalities from the MBMS service delivery functionalities supported by the network device for a multimedia content associated with the application server.

Figure 7:
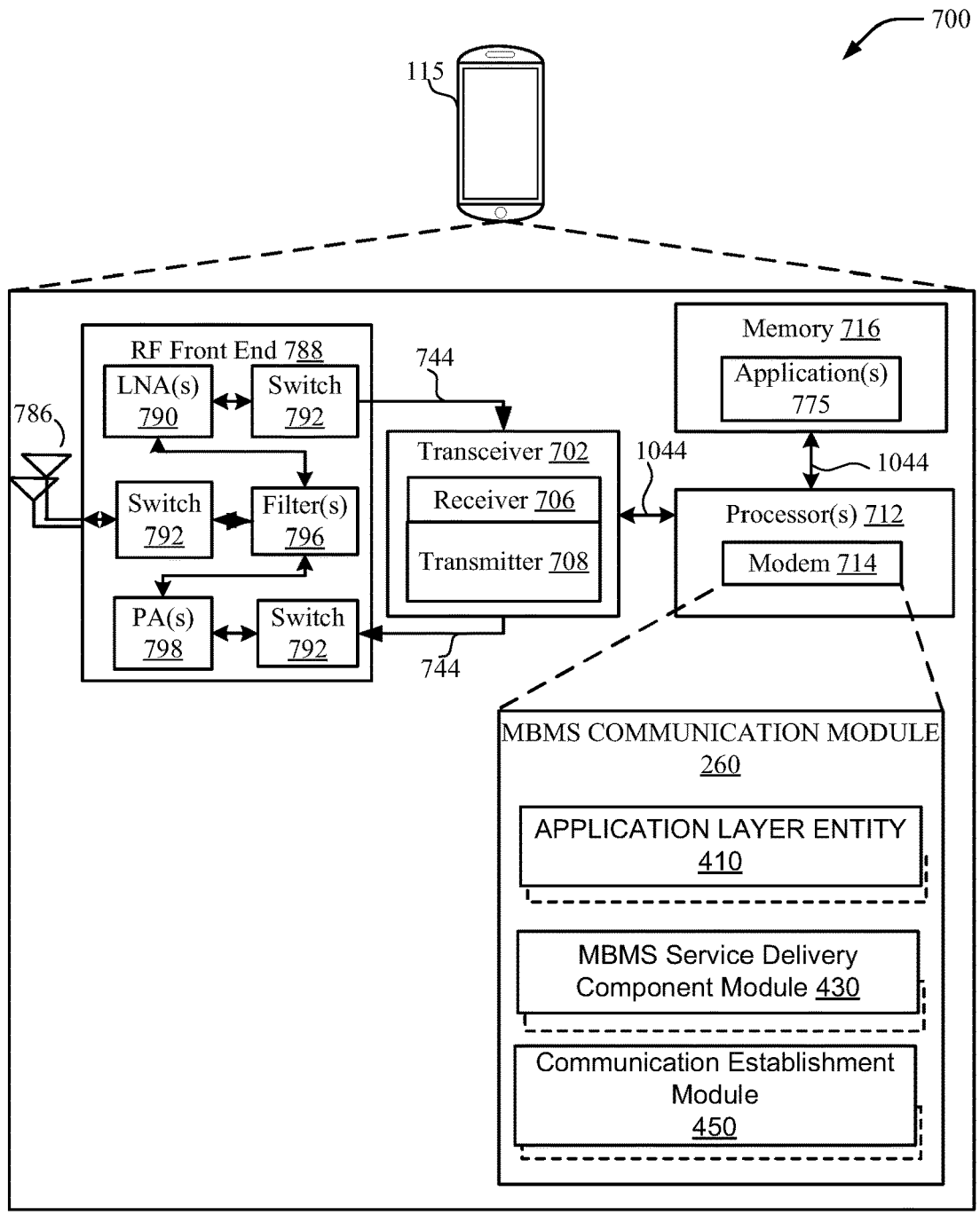
FIG. 7 is a diagram illustrating another example of a hardware implementation for an apparatus employing a processing system.

FIG. 7 describes one example of an implementation of a UE 115 that may include a variety of components, some of which have already been described above, but including components such as one or more processors 712 and memory 716 and transceiver 702 in communication via one or more buses 744, which may operate in conjunction with MBMS communication component 260 to enable one or more of the functions described herein related to including one or more methods of the present disclosure. Further, the one or more processors 712, modem 714, memory 716, transceiver 702, RF front end 788 and one or more antennas 786, may be configured to support voice and/or data calls (simultaneously or non-simultaneously) in one or more radio access technologies.

In an aspect, the one or more processors 712 can include a modem 714 that uses one or more modem processors. The various functions related to MBMS communication component 260 may be included in modem 714 and/or processors 712 and, in an aspect, can be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or modem 714 associated with MBMS communication component 260 may be performed by transceiver 702.

As noted above, the MBMS communication component 260 may include an application layer entity 410, MBMS service delivery component 430, and communication establishment component 450. Also, memory 716 may be configured to store data used herein and/or local versions of applications 775 or MBMS communication component 260 and/or one or more of its subcomponents being executed by at least one processor 712. Memory 716 can include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, memory 716 may be a non-transitory computer-readable storage medium that stores one or more computer-executable codes defining MBMS communication component 260 and/or one or more of its subcomponents.

Transceiver 702 may include at least one receiver 706 and at least one transmitter 708. Receiver 706 may include hardware, firmware, and/or software code executable by a processor for receiving data, the code comprising instructions and being stored in a memory (e.g., computer-readable medium). Receiver 706 may be, for example, a radio frequency (RF) receiver. In an aspect, receiver 706 may receive signals transmitted by at least one AP 105. Additionally, receiver 706 may process such received signals, and also may obtain measurements of the signals, such as, but not limited to, Ec/Io, SNR, RSRP, RSSI, etc. Transmitter 708 may include hardware, firmware, and/or software code executable by a processor for transmitting data, the code comprising instructions and being stored in a memory (e.g., computer-readable medium). A suitable example of transmitter 708 may including, but is not limited to, an RF transmitter.

Moreover, in an aspect, UE 115 may include RF front end 788, which may operate in communication with one or more antennas 786 and transceiver 702 for receiving and transmitting radio transmissions, for example, wireless communications transmitted by at least one AP 105 or wireless transmissions transmitted by another UE 115. RF front end 788 may be connected to one or more antennas 786 and can include one or more low-noise amplifiers (LNAs) 790, one or more switches 792 and 794, one or more power amplifiers (PAs) 798, and one or more filters 796 for transmitting and receiving RF signals.

In an aspect, LNA 790 can amplify a received signal at a desired output level. In an aspect, each LNA 790 may have a specified minimum and maximum gain values. In an aspect, RF front end 788 may use one or more switches 792 to select a particular LNA 790 and its specified gain value based on a desired gain value for a particular application.

Further, for example, one or more PA(s) 798 may be used by RF front end 788 to amplify a signal for an RF output at a desired output power level. In an aspect, each PA 798 may have specified minimum and maximum gain values. In an aspect, RF front end 788 may use one or more switches 792 to select a particular PA 798 and its specified gain value based on a desired gain value for a particular application.

Also, for example, one or more filters 796 can be used by RF front end 788 to filter a received signal to obtain an input RF signal. Similarly, in an aspect, for example, a respective filter 796 can be used to filter an output from a respective PA 798 to produce an output signal for transmission. In an aspect, each filter 796 can be connected to a specific LNA 790 and/or PA 798. In an aspect, RF front end 788 can use one or more switches 792, 794 to select a transmit or receive path using a specified filter 796, LNA 790, and/or PA 798, based on a configuration as specified by transceiver 702 and/or processor 712.

As such, transceiver 702 may be configured to transmit and receive wireless signals through one or more antennas 786 via RF front end 788. In an aspect, transceiver may be tuned to operate at specified frequencies such that STA 115 can communicate with, for example, one or more APs 105 or one or more cells associated with one or more APs 105. In an aspect, for example, modem 1014 can configure transceiver 702 to operate at a specified frequency and power level based on the AP configuration of the AP 105 and the communication protocol used by modem 714.

In an aspect, modem 714 can be a multiband-multimode modem, which can process digital data and communicate with transceiver 702 such that the digital data is sent and received using transceiver 702. In an aspect, modem 714 can be multiband and be configured to support multiple frequency bands for a specific communications protocol. In an aspect, modem 714 can be multimode and be configured to support multiple operating networks and communications protocols. In an aspect, modem 774 can control one or more components of UEs 115 (e.g., RF front end 788, transceiver 702) to enable transmission and/or reception of signals from the network based on a specified modem configuration. In an aspect, the modem configuration can be based on the mode of the modem and the frequency band in use.

Figure 8:
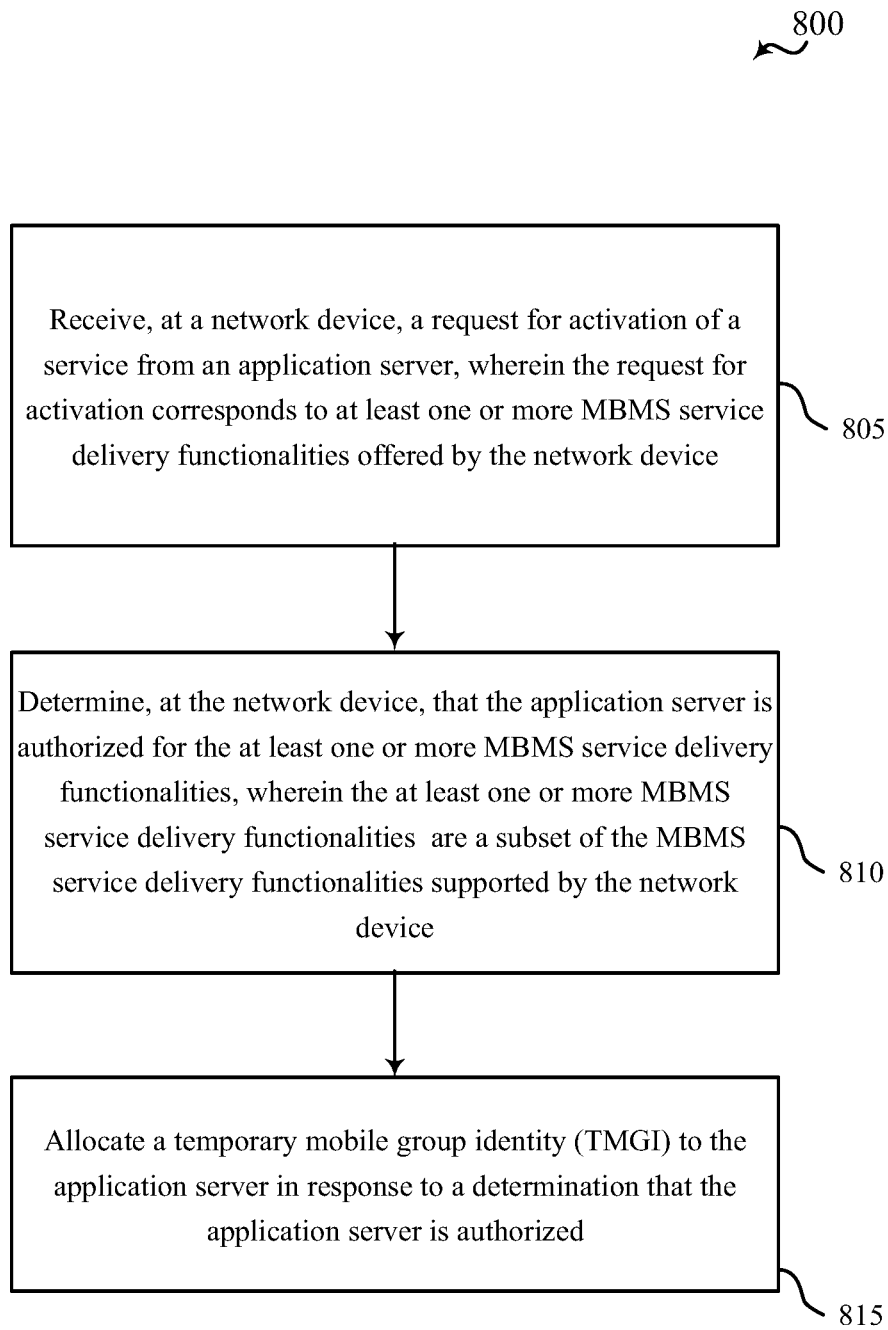
FIG. 8 illustrates an example of a flowchart performed by the network device in accordance with various aspects of the present disclosure.

FIG. 8 is a flowchart conceptually illustrating an example of a method 800 of wireless communication, in accordance with aspects of the present disclosure. For clarity, the method 800 is described below with reference to the BM-SC 226, described with reference to FIGS. 1-3.

At block 805, the method 800 may include receiving, at a network device, a request for activation of a service from an application server indicated, wherein the request for activation corresponds to at least one or more MBMS service delivery functionalities offered by the network device. Aspects of the block 805 may be performed by service request processing component 535 and/or transceiver 610 as described with reference to FIGS. 5 and 6.

At block 810, the method 800 may include determining, at the network device, that the application server is authorized for the at least one or more MBMS service delivery functionalities. The at least one or more MBMS service delivery functionalities may be a subset of the MBMS service delivery functionalities supported by the network device. Aspects of the block 810 may be performed by service authentication component 540 described with reference to FIG. 5.

At block 815, the method 800 may include allocating a temporary mobile group identity (TMGI) to the application server in response to a determination that the application server is authorized. Aspects of the block 810 may be performed by resource allocation component 545 described with reference to FIG. 5.

Figure 9:
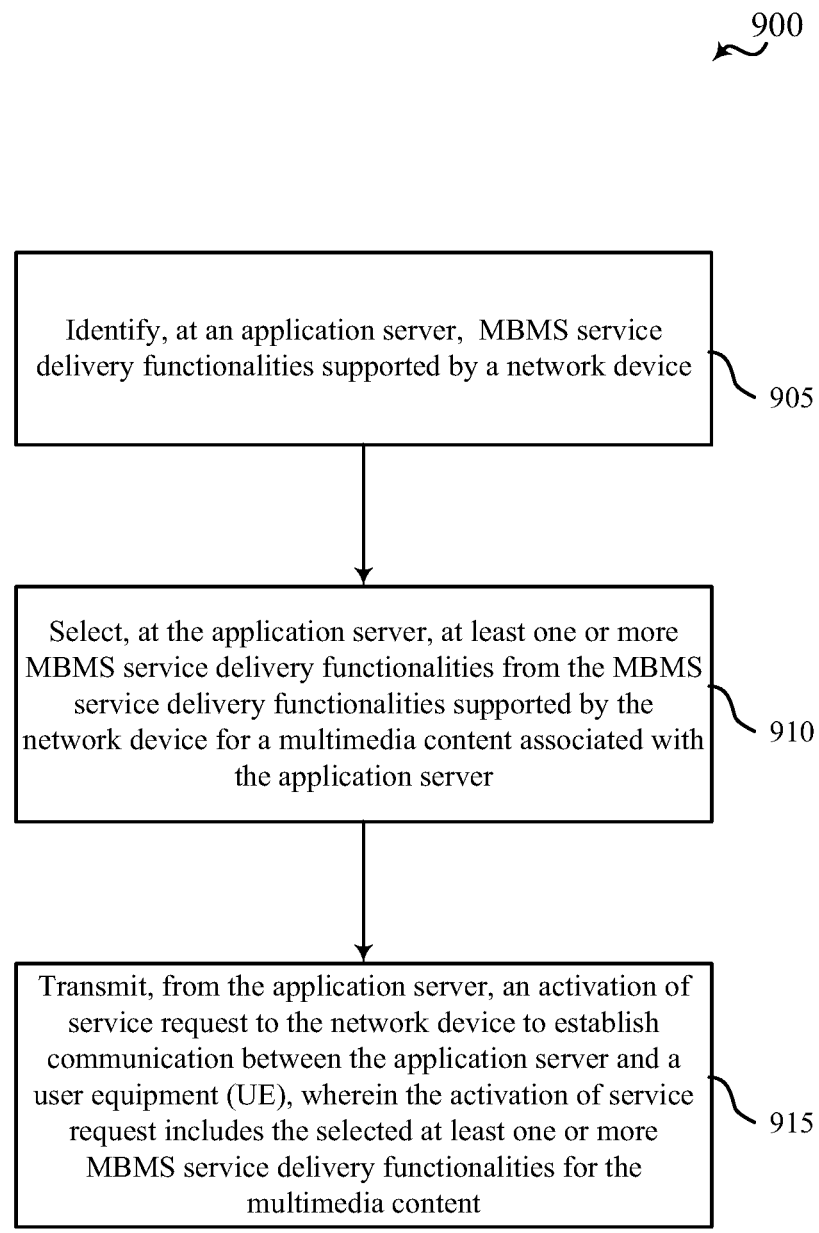
FIG. 9 illustrates an example of a flowchart performed by the application server in accordance with various aspects of the present disclosure.

FIG. 9 is a flowchart conceptually illustrating an example of a method 900 of wireless communication, in accordance with aspects of the present disclosure. For clarity, the method 900 is described below with reference to one of the GCS-AS, described with reference to FIGS. 1-3.

At block 905, the method 900 may include identifying, at an application server, MBMS service delivery functionalities supported by a network device. Aspects of the block 905 may be performed by MBMS functionality identification component 555 as described with reference to FIG. 5.

At block 910, the method 900 may include selecting, at the application server, at least one or more MBMS service delivery functionalities from the MBMS service delivery functionalities supported by the network device for a multimedia content associated with the application server. Aspects of the block 910 may be performed by MBMS functionality selection component 560 described with reference to FIG. 5.

At block 915, the method 900 may include transmitting, from the application server, an activation of service request to the network device to establish communication between the application server and a user equipment (UE). In some examples, the service request includes the selected at least one or more MBMS service delivery functionalities for the multimedia content. Aspects of the block 915 may be performed by service activation request component 565 described with reference to FIG. 5.

Figure 10:
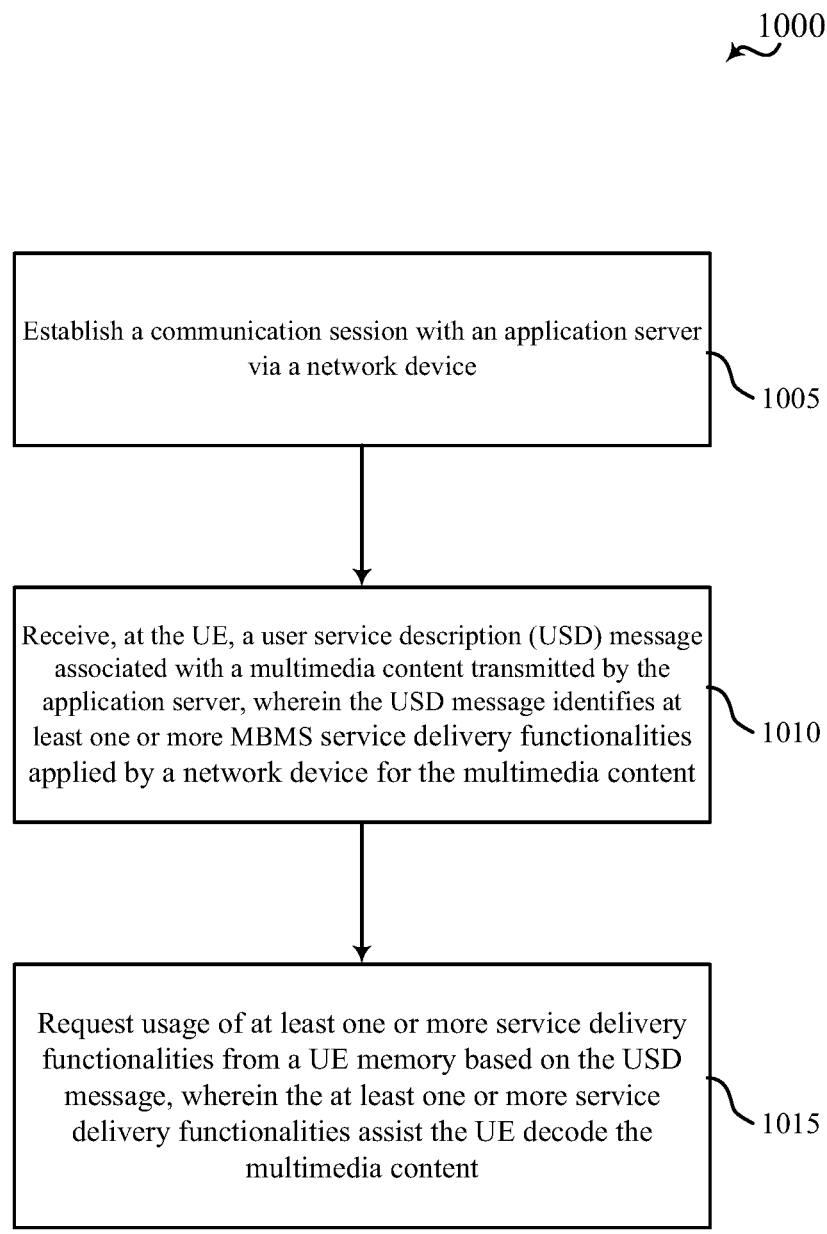
FIG. 10 illustrates another example of a flowchart performed by the UE in accordance with various aspects of the present disclosure.

FIG. 10 is a flowchart conceptually illustrating an example of a method 1000 of wireless communication, in accordance with aspects of the present disclosure. For clarity, the method 1000 is described below with reference to one or more UEs 115, described with reference to FIGS. 1-3.

At block 1005, the method 1000 may include establishing a communication session with an application server via a network device. Aspects of the block 1005 may be performed by communication establishment component 450 as described with reference to FIG. 4. In some examples, the communication establishment component 450 may be part of transceiver 710 discussed with reference to FIG. 7.

At block 1010, the method 1000 may include receiving, at the UE, a user service description (USD) message associated with a multimedia content transmitted by the application server. The USD message may identify at least one or more MBMS service delivery functionalities applied by a network device for the multimedia content. Aspects of the block 1015 may be performed by communication establishment component 450 as described with reference to FIG. 4.

At block 1015, the method 1000 may include requesting usage of at least one or more service delivery functionalities from a UE memory based on the USD message. In some aspects, the at least one or more service delivery functionalities may assist the UE decode the multimedia content. Aspects of the block 1015 may be performed by MBMS functionality retrieval component 415 as described with reference to FIG. 4.

The detailed description set forth above in connection with the appended drawings describes example embodiments and does not represent all the embodiments that may be implemented or that are within the scope of the claims. The term "exemplary," as used in this description, means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but are to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile Communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method for wireless communication at a user equipment (UE) for multimedia broadcast and multicast service (MBMS), comprising:
    establishing a communication session with an application server via a broadcast multicast service center (BMSC);
    receiving, at the UE and from the BMSC, a service announcement message that includes a user service description (USD) associated with a multimedia content transmitted by the application server, wherein the USD identifies at least one or more MBMS service delivery functionalities applied by the BMSC for the multimedia content based on at least one or more MBMS service delivery functionalities that the UE is capable of performing;
    receiving, at an application layer of the UE, a service identification (ID) associated with the USD at a lower layer, wherein the application layer requests the lower layer to retrieve at least one or more service delivery functionalities associated with the service ID; and
    requesting usage of the at least one or more service delivery functionalities from a UE memory based on the USD, wherein the at least one or more service delivery functionalities assist the UE decode the multimedia content,
wherein the at least one or more MBMS service delivery functionalities include content access control functionality, bootstrapping functionality, file repair functionality, or a combination thereof.

2. The method of claim 1, wherein the USD is provided to an application layer of the UE using application layer signaling, and wherein requesting usage of the at least one or more service delivery functionalities from the UE memory comprises having the application layer request that a lower layer in the UE forward the at least one or more service delivery functionalities to the application layer.

3. The method of claim 1, wherein the lower layer retrieves the at least one or more service delivery functionalities associated with the service ID by correlating the service ID against the USD received from the BMSC.

4. The method of claim 1, wherein requesting usage of the at least one or more service delivery functionalities from the UE memory comprises:
    identifying at least one or more MBMS service delivery components associated with the one or more service delivery functionalities; and
    accessing the at least one or more MBMS service delivery components to retrieve the one or more service delivery functionalities for an application layer.

5. A user equipment (UE) for multimedia broadcast and multicast service (MBMS), comprising:
    a memory configured to store instructions; and
    a processor communicatively coupled with the memory, the processor configured to execute the instructions to:
        establish a communication session with an application server via a broadcast multicast service center (BMSC);
        receive, at the UE, a service announcement message that includes a user service description (USD) associated with a multimedia content transmitted by the application server, wherein the USD identifies at least one or more MBMS service delivery functionalities applied by the BMSC for the multimedia content based on at least one or more MBMS service delivery functionalities that the UE is capable of performing;
        receive, at an application layer of the UE, a service identification (ID) associated with the USD at a lower layer, wherein the application layer requests the lower layer to retrieve at least one or more service delivery functionalities associated with the service ID; and
        request usage of the at least one or more service delivery functionalities from a UE memory based on the USD, wherein the at least one or more service delivery functionalities assist the UE decode the multimedia content,
wherein the at least one or more MBMS service delivery functionalities include content access control functionality, bootstrapping functionality, file repair functionality, or a combination thereof.

6. The UE of claim 5, wherein the USD is provided to an application layer of the UE using application layer signaling, and wherein requesting usage of the at least one or more service delivery functionalities from the UE memory comprises having the application layer request that a lower layer in the UE forward the at least one or more service delivery functionalities to the application layer.

7. The UE of claim 5, wherein the lower layer retrieves the at least one or more service delivery functionalities associated with the service ID by correlating the service ID against the USD received from the BMSC.

8. The UE of claim 5, wherein the processor configured to execute the instructions to request usage of the at least one or more service delivery functionalities from the UE memory is further configured to execute the instructions to:
identify at least one or more MBMS service delivery components associated with the one or more service delivery functionalities; and
access the at least one or more MBMS service delivery components to retrieve the one or more service delivery functionalities for an application layer.

9. An apparatus for wireless communication at a user equipment (UE) for multimedia broadcast and multicast service (MBMS), comprising:
means for establishing a communication session with an application server via a broadcast multicast service center (BMSC);
means for receiving, at the UE and from the BMSC, a service announcement message that includes a user service description (USD) associated with a multimedia content transmitted by the application server, wherein the USD identifies at least one or more MBMS service delivery functionalities applied by the BMSC for the multimedia content based on at least one or more MBMS service delivery functionalities that the UE is capable of performing;
means for receiving, at an application layer of the UE, a service identification (ID) associated with the USD at a lower layer, wherein the application layer requests the lower layer to retrieve at least one or more service delivery functionalities associated with the service ID; and
means for requesting usage of the at least one or more service delivery functionalities from a UE memory based on the USD, wherein the at least one or more service delivery functionalities assist the UE decode the multimedia content,
wherein the at least one or more MBMS service delivery functionalities include content access control functionality, bootstrapping functionality, file repair functionality, or a combination thereof.

10. The apparatus of claim 9, wherein the USD is provided to an application layer of the UE using application layer signaling, and wherein means for requesting usage of the at least one or more service delivery functionalities from the UE memory comprises having the application layer request that a lower layer in the UE forward the at least one or more service delivery functionalities to the application layer.

11. The apparatus of claim 10, wherein the lower layer retrieves the at least one or more service delivery functionalities associated with the service ID by correlating the service ID against the USD received from the BMSC.

12. The apparatus of claim 9, wherein the means for requesting usage of the at least one or more service delivery functionalities from the UE memory comprises:
means for identifying at least one or more MBMS service delivery components associated with the one or more service delivery functionalities; and
means for accessing the at least one or more MBMS service delivery components to retrieve the one or more service delivery functionalities for an application layer.

13. A non-transitory computer-readable medium storing code for wireless communication at a user equipment (UE) for multimedia broadcast and multicast service (MBMS), the code comprising instructions executable to:
establish a communication session with an application server via a broadcast multicast service center (BMSC);
receive, at the UE and from the BMSC, a service announcement message that includes a user service description (USD) associated with a multimedia content transmitted by the application server, wherein the USD identifies at least one or more MBMS service delivery functionalities applied by the BMSC for the multimedia content based on at least one or more MBMS service delivery functionalities that the UE is capable of performing;
receive, at an application layer of the UE, a service identification (ID) associated with the USD at a lower layer, wherein the application layer requests the lower layer to retrieve at least one or more service delivery functionalities associated with the service ID; and
request usage of the at least one or more service delivery functionalities from a UE memory based on the USD message, wherein the at least one or more service delivery functionalities assist the UE decode the multimedia content,
wherein the at least one or more MBMS service delivery functionalities include content access control functionality, bootstrapping functionality, file repair functionality, or a combination thereof.

14. The non-transitory computer-readable medium of claim 13, wherein the USD is provided to an application layer of the UE using application layer signaling, and wherein requesting usage of the at least one or more service delivery functionalities from the UE memory comprises having the application layer request that a lower layer in the UE forward the at least one or more service delivery functionalities to the application layer.

15. The non-transitory computer-readable medium of claim 13, wherein the lower layer retrieves the at least one or more service delivery functionalities associated with the service ID by correlating the service ID against the USD received from the BMSC.

16. The non-transitory computer-readable medium of claim 13, wherein requesting usage of the at least one or more service delivery functionalities from the UE memory comprises:
identifying at least one or more MBMS service delivery components associated with the one or more service delivery functionalities; and
accessing the at least one or more MBMS service delivery components to retrieve the one or more service delivery functionalities for an application layer.

* * * * *